United States Patent [19]
Frederickson et al.

[11] 3,780,304
[45] Dec. 18, 1973

[54] CHARGE ACCUMULATION GAMMA RADIATION DETECTOR

[76] Inventors: Arthur R. Frederickson, Red Acre Rd., Stow, Mass. 01775; Arnold D. Morris, 456 Grove St., Braintree, Mass. 02184

[22] Filed: Jan. 28, 1972

[21] Appl. No.: 221,666

[52] U.S. Cl. .............................. 250/336, 250/457
[51] Int. Cl. .................................. G01t 1/16
[58] Field of Search ............... 250/83.3 R, 83.3 RD, 250/83.6 R, 336, 457

[56] References Cited
UNITED STATES PATENTS
2,696,564  12/1954  Ohmart ..................... 250/83.6 R Primary Examiner—James W. Lawrence
Assistant Examiner—Davis L. Willis
Attorney—Harry A. Herbert, Jr. et al.

[57] ABSTRACT

A gamma ray detector is provided which utilizes the charge accumulation at interfaces effect to measure γ-ray intensities. The detector includes a multiplicity of electrically conductive plates mounted in a vacuum chamber. All the plates are substantially parallel to each other. The gamma beam passes successively through all the plates. An electrical current flowing between the inner plates is a measure of the γ-beam intensity.

10 Claims, 1 Drawing Figure

PATENTED DEC 18 1973
3,780,304
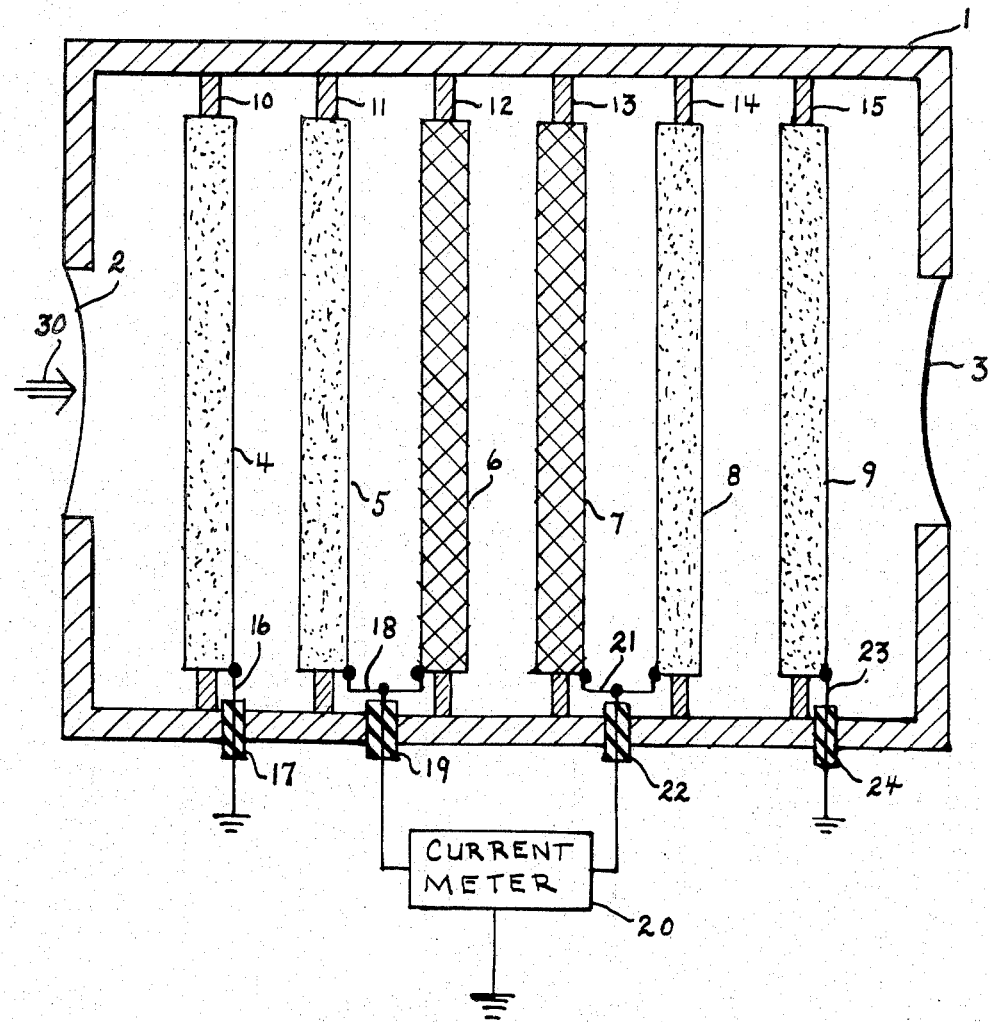

3,780,304

CHARGE ACCUMULATION GAMMA RADIATION DETECTOR

BACKGROUND OF INVENTION

This invention relates to gamma ray detectors, and more particularly to gamma ray detector for measuring intensities.

In the prior art there have been utilized gamma ray counters for detecting γ-radiation which either yield information about the integrated intensity within a time interval or register each photon separately. The working principle of such counters must always be the interaction with matter, primarily the production of fast electrons by γ-quanta, and thus any detector for electrons will also detect γ-rays. The efficiency, that is, the probability that a photon passing through sensitive volume (the volume where an event can be registered) is generally poor. Ionization chambers are used mainly as integrating instruments. Because of its simplicity, the Geiger tube is frequently used for general purposes. Above 100 kev its efficiency is low; the most generally used device is known as the "Compton diode" detector. One of the severe limitations of the above-recited detectors resides in measurement over the entire intensity range of the gamma rays. It is noted that the energies of nuclear gamma rays (γ-rays) range from practically zero up to the order of 10 Mev. It is particularly difficult to obtain measurements with the present detector devices at high intensities without damage to the apparatus and without saturation.

The "Compton diode" detectors are physically large because they must absorb a significant portion of the γ-ray beam. The present invention has similar or better sensitivity than the "Compton diode" while having a much smaller size and weight.

The present invention provides a gamma ray detector device which is especially useful at high intensities. Further, it requires no exterior power source to make it operative. The γ-ray beam and the device are all that is needed to produce the electrical signal. The device is able to operate at very high intensity γ-levels without being damaged and without saturating. The output is linearly proportional to gamma ray intensity.

An object of the present invention is to provide a gamma ray detector particularly effective in measuring intensities over the entire gamma ray range and providing an output signal linearly proportional to the gamma ray intensity.

Another object of the present invention is to provide a gamma ray detector capable of measuring high intensities without damage to the detector and without saturation thereof.

Still another object of the present invention is to provide a gamma ray detector not requiring an external or internal power source.

Another object of the present invention is to provide a γ-ray detector, capable of measuring high intensities, and is light in weight and small in size. Another object of the present invention is to provide a gamma ray detector that does not contain insulating materials in the path of the radiation; in this manner the detector will not be subject to instabilities caused by insulator charging and radiation damage.

SUMMARY OF THE INVENTION

A gamma ray detector device is provided which uses the charge accumulation at interfaces effect to measure gamma rays. The device is comprised of plates of metal mounted in a vacuum chamber, all substantially parallel to each other. A gamma ray beam passes successively through all the plates. An electrical current flowing between the inner plates is a measure of the gamma ray beam intensity. It is only necessary that the plates be electrical conductors and that they be of a predetermined atomic number.

DESCRIPTION OF THE DRAWINGS

The single FIGURE shows a preferred embodiment of the invention.

DETAILED DESCRIPTION OF THE PREFERRED EMBODIMENT

Now referring in detail to the single FIGURE, there is shown metal vacuum chamber 1 having a vacuum therein of $1 \times 10^{-5}$ torr or less. Metal vacuum chamber 1 includes conventional metal foil vacuum windows 2 and 3 which permit the passage of gamma rays therethrough. Electrical conductive plates 4–9 are arranged within metal vacuum chamber 1 in a substantially parallel relationship to each other. The spacing between the plates is not critical but in this embodiment were approximately evenly spaced. Plates 4–9 are retained in a fixed position by annular electrical insulating wires 10–15 respectively. Any suitable means may be utilized for positioning. Electrical conductor 16 is connected to plate 4 and is led through any suitable vacuum tight fitting 17 to ground. Electrical conductor 18 is connected to plates 5 and 6 and is led through vacuum tight insulated fitting 19 to current meter 20. Electrical conductor 21 is connected to plates 7 and 8 and is led through vacuum tight insulated fitting 22 to current meter 20. Current meter 20 is differentially connected and balanced to ground. The balance to ground is not necessary but increases the detector's sensitivity by balancing emission currents to the chamber and plates. Electrical conductor 23 is connected to plate 9 and is led through vacuum tight fitting 24 to ground.

It is noted that plates 4, 5, 8 and 9 may be either high Z or low Z (atomic weight) metal with a thickness from ½ to 1 electron range. Plates 6 and 7 may be either a low Z or a high Z, but opposite in kind to plates 4, 5, 8 and 9. More specifically if plates 4, 5, 8 and 9 are of a low atomic weight then plates 6 and 7 are of a high atomic weight. The plates have a thickness of ½ to 1 electron range. An electron range is the approximate range of an electron, in the material, with energy of $h\nu$, where $h$ is planck's constant and $\nu$ is photon "frequency." Plate thickness > 1 range will have little effect and less than one-half range will decrease the meter current.

In the operation of the gamma ray detector, collimated beam 30 is directed toward metal foil vacuum "window" 2. Gamma rays pass therethrough and then successively through electrically conductive plates 4–9 and finally metal foil vacuum "window" 3. The vacuum windows 2 and 3 are not always necessary to the operation of the detector. In situations where the outer casing of the detector may be held at instrument ground potential without affecting the beam source, plates 4 and 9 can act at once as windows, detector vacuum casing and as instrument ground. In one instance plates 4–9 were Ta(tantalum), Al (aluminum), Al, Ta, and Ta, respectively, in the order in which the γ-beam transversed them. The current flow, as read by meter 20, between the first Ta, Al plates and the Al, Ta plates was approximately $1.1 \times 10^{-11}$ amps using a Cobalt 60 gamma beam of approximately 60 roentgens/min through approximately 13 cm². Using Ta, Ta, Be, Ta, Ta plates, in another instance, the current flow was approximately $2 \times 10^{-11}$ amps under the same irradiation.

It is emphasized that the gamma ray detector of the present invention uses the charge accumulation at interfaces effect to measure γ-ray intensities. In passing through matter, γ-rays create high energy electrons which distribute themselves throughout the matter. When matter is nonhomogoneous, the electrons are distributed in a nonhomogeneous manner. The nonhomogeneous distribution of electrons result in an electronic current which is measured by meter 20. The detector is used to detect γ-rays over a large energy range and is especially useful at high intensities. The electrical output is directly proportional to the number of γ-ray photons per second passing through the detector. The electrical current flowing between the inner plates is the measure of the γ-beam intensity. It is only necessary that the plates be electrical conductors and that they be of proper atomic number as aforementioned.

The vacuum windows 2 and 3 are not always necessary to the operation of the detector. In situations where the outer casing of the detector may be held at instrument ground potential without affecting the γ-beam source, plates 4 and 9 can act at once as windows, detector vacuum casing and as instrument ground.

One of the features of this invention is the arrangement of high and low atomic number elements. Another feature is that the detector is "thin" so that most of the γ-beam passes through and since it is thin, several detectors can be stacked in series providing a large signal per photon. Still another feature is that the detector requires no exterior power source such as batteries to make it work, since all that is needed is the γ-beam and the detector to produce an electrical signal.

A most important feature is the ability of the detector to operate at very high intensity levels without being damaged and without saturation. The plates will not melt or fracture or become permanently electrically charged. Finally, the output is linearly proportional to gamma ray intensity.

It is noted that plates 4–9 are electrical conductors having a suitable area and may have virtually any desirable configuration. They may be circular, oval, rectangular, et cetera. The vacuum chamber may also be of some material other than metal.

What is claimed is:

1. A charge accumulation gamma radiation detector comprising a vacuum chamber having first and second ends, first and second passage means to permit the flow of a gamma beam therethrough, said first and second passage means being included and integrated with said first and second ends, respectively, a multiplicity of successive electrical conductors positioned inside said vacuum chamber and interposed between said first and second passage means, said multiplicity of electrical conductors being substantially parallel to each other and separated from each other, the outer electrical conductors having a first predetermined atomic number and the inner electrical conductors having a second predetermined atomic number different than said first predetermined atomic number, means to connect one of said inner conductors to one of said outer conductors to form a first pair of conductors, means to electrically connect another of said inner conductors to another of said outer conductors to form a second pair of conductors, and means to measure the electrical output signal representative of gamma beam intensity upon the passage of a gamma beam successively through said first passage means, said multiplicity of electrical conductors, and said second passage means, said means to measure being electrically connected between said first and second pairs of conductors to permit a reading of electric current resulting from the nonhomogeneous distribution of electrons in said first and second pairs of conductors.

2. A charge accumulation gamma radiation detector as defined in claim 1 with said outer electrical conductors being of a high atomic number and said inner electrical conductors being of a low atomic number.

3. A charge accumulation gamma radiation detector as defined in claim 1 with said outer electrical conductors being of a low atomic number and said inner electrical conductors being of a high atomic number.

4. A charge accumulation radiation detector as defined in claim 1 wherein each of said multiplicity of electrical conductors has an approximate thickness of ½ to 1 electron range.

5. A charge accumulation radiation detector as defined in claim 1 wherein said multiplicity of electrical conductors is comprised of first, second, third, fourth, fifth, and sixth plates, said first, second, fifth and sixth plates being outer plates and of a high atomic number, said third and fourth being inner plates and of a low atomic number, said second plate being electrically connected to said third plate for a first output and said fourth plate being electrically connected to said fifth plate to provide a second output, with said means to measure being comprised of a current meter differentially connected between said first and second outputs and also being balanced to ground.

6. A charge accumulation radiation detector as defined in claim 1 wherein said multiplicity of electrical conductors is comprised of first, second, third, fourth, fifth, and sixth plates, said first, second, fifth and sixth plates being outer plates and of a low atomic number, said third and fourth being inner plates and of a high atomic number, said second plate being electrically connected to said third plate for a first output and said fourth plate being electrically connected to said fifth plate to provide a second output, with said means to measure being comprised of a current meter differentially connected between said first and second outputs and also being balanced to ground.

7. A charge accumulation radiation detector as defined in claim 5 wherein each of said plates has a thickness of approximately ½ to 1 electron range with said first and sixth plate being grounded.

8. A charge accumulation radiation detector as defined in claim 6 wherein each of said plates has a thickness of approximately ½ to 1 electron range with said first and sixth plate being grounded.

9. A charge accumulation radiation detector as defined in claim 1 wherein said multiplicity of electrical conductors consists of first, second, third, fourth, fifth, and sixth plates approximately even spaced from each other, with the gamma beam successively passing from said first through said sixth plate, said first, second, fifth, and sixth plate being of a high atomic number and said third and fourth being of a low atomic number with said second and third plate being electrically interconnected to form a first pair of said fourth and fifth plate being electrically interconnected to form a second pair, and wherein said means to measure the electrical output signal is comprised of a current meter differentially connected between said first and second pair and also being balanced to ground.

10. A charge accumulation radiation detector as defined in claim 1 wherein said multiplicity of electrical conductors consists of first, second, third, fourth, fifth, and sixth plates approximately evenly spaced from each other, with the gamma beam successively passing from said first through said sixth plate, said first, second, fifth, and sixth plate being of a low atomic number and said third and fourth being of a high atomic number with said second and third plate being electrically interconnected to form a first pair and said fourth and fifth plate being electrically interconnected to form a second pair, and wherein said means to measure the electrical output signal is comprised of a current meter differentially connected between said first and second pair and also being balanced to ground.

* * * * *